No. 660,992. Patented Oct. 30, 1900.
J. S. KIDD.
WAGON DUMP AND ELEVATOR.
(Application filed Dec. 22, 1898.)
(No Model.)
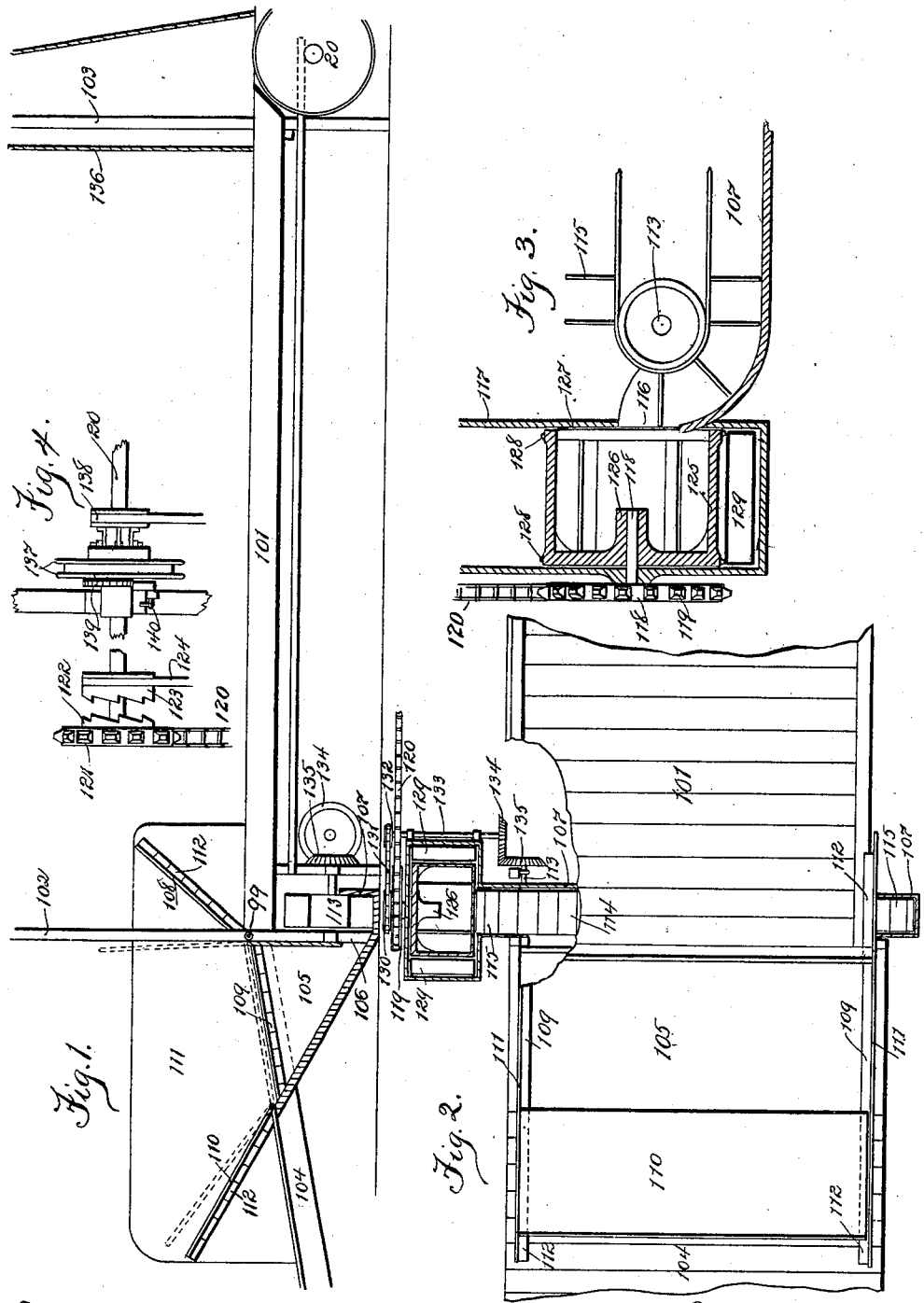

UNITED STATES PATENT OFFICE.

JOHN S. KIDD, OF DES MOINES, IOWA.

WAGON-DUMP AND ELEVATOR.

SPECIFICATION forming part of Letters Patent No. 660,992, dated October 30, 1900.

Application filed December 22, 1898. Serial No. 700,084. (No model.)

*To all whom it may concern:*

Be it known that I, JOHN S. KIDD, a citizen of the United States of America, and a resident of Des Moines, in the county of Polk and State of Iowa, have invented a new and useful Wagon-Dump and Elevator, of which the following is a specification.

The object of this invention is to provide improved means for dumping a wagon, receiving the contents of said wagon, conveying said contents laterally of the wagon, and elevating and depositing the same as desired.

My invention consists in the construction, arrangement, and combination of elements hereinafter set forth, pointed out in my claims, and illustrated by the accompanying drawings, in which—

Figure 1 is an elevation in section of a form of my machine in which a receptacle is formed in the platform and which employs a lateral conveyer to remove the grain from the receptacle to an elevator-leg. Fig. 2 is a plan of the machine shown in Fig. 1. Fig. 3 is a detailed side elevation, partly in section, of the lateral conveyer. Fig. 4 is a detailed elevation of a portion of the mechanism employed to oscillate the wagon-platform and elevate the grain.

In the construction of the apparatus as shown the numeral 101 designates a platform fulcrumed at 99, its rear end in a supporting-frame 102 and resting at its forward end in a supporting-frame 103, connected to the frame 102. A platform-approach 104 is fixed at its forward and upper end to the frame 102, coincident with the rear end of the platform 101. An opening is formed in the approach-platform 104, and a hopper 105 is located beneath said opening, which hopper has a forwardly-discharging port 106, extending its entire length and communicating with a conveyer-trough 107. A trap-door 108 is hinged to the forward end of the upper edge of the hopper 105 and when said hopper is closed rests upon cleats 109, fixed to the interior faces of the ends of the hopper. A trap-door 110 is hinged to the upper edge of the rear portion of the hopper 105 and when said hopper is closed rests on the trap-door 108, thereby forming a portion of the passage-way or approach to the main platform. The ends of the hopper 105 are extended upwardly, forwardly, and rearwardly from the approach 104 to form wings 111 and are provided with cleats 112 in inclined positions, on which cleats the doors 108 110 rest when the hopper is open. A drum-shaft 113 is horizontally positioned transversely of the left end of the conveyer-trough 107, and a drum-shaft (not shown) is mounted at the opposite end of said conveyer-trough. A conveyer 114 is mounted on the drum-shafts and comprises a belt having laterally-projecting flights 115 thereon and projecting downwardly therefrom to the bottom of the conveyer-trough. The conveyer-trough 107 is curved upwardly at its left end and communicates with an aperture 116 in the side of an elevator-leg 117, which elevator-leg rises to the plane of the desired delivery of the grain. A stub-axle 118 is mounted in the lower portion of the elevator-leg 117, and a sprocket-wheel 119, mounted on said axle, is connected by a sprocket-chain 120 to a sprocket-wheel 121 on the power-shaft 20 of a treadmill horse-power. A clutch member 122 is formed on a sprocket-wheel 121, and a clutch member 123, mounted for longitudinal movement on the shaft 20, meshes at times with said clutch member 122. A lever 124 is provided, whereby the clutch member 125 may be moved longitudinally of the shaft 20. An elevator wheel or drum 125, provided with a short hub 126, is mounted on the stub-axle 118, the said hub extending less than half the length of the face of the wheel. The rim of the wheel 125 is formed of a series of bars in a row concentric with the axle 118 and parallel therewith, and the outer ends of said bars are connected by a ring 127, which ring surrounds the aperture 116 in the elevator-leg, thus forming a drum-wheel of skeleton shape which may be fed to its interior from the conveyer-trough 107. Sprocket-teeth 128 are formed on the arms of the wheel 125 and may carry a sprocket-chain (not shown) to which elevator-buckets 129 are attached. It will be observed that spaces between the bars of the wheel 125 and between the elevator-buckets 129 provide means for depositing the grain from the conveyer-trough into the bottom of the elevator-leg and into the path of travel of the elevator-buckets. A sprocket-wheel 130 is mounted on the extreme outer end of the stub-axle 118 and is connected by a chain 131 to a sprocket-wheel 132 on a shaft 133, the opposite end of said shaft being connected by a bevel-gear 134 to a bevel-gear 135 on the shaft 113, thereby providing means for driving the conveyer 114 coincident with the elevation of the grain by the buckets 129.

The forward end of the platform 101 is connected by a cable 136, extending over a sheave (not shown) on the upper end of the frame and downwardly to the shaft 20, as follows: A wheel formed of a pair of disks 137, arranged in close relation to each other and connected, is mounted on the shaft 20 loosely, and the lower end of the cable 136 is connected to said wheel. A friction-clutch 138 is keyed to the shaft 20 and engages at times with the wheel 137. A ratchet 139 is formed on the wheel 20 and is engaged at times by a pawl 140 to prevent reverse movement of said wheel. A horse-power, as described in my application, Serial No. 594,619, filed June 6, 1896, may be applied to the shaft 20, and when so applied the operation of the machine is as follows: The trap-doors are closed. A loaded wagon is drawn upon the recumbent platform 101 and chucked against rearward and forward movement thereon by means of the chuck described in my application above mentioned. The trap-doors are opened against the cleats 112. The clutch 123 is engaged with the clutch 122. The clutch 138 is engaged with the wheel 137. The horse-power is operated so that the shaft 20 is rotated, and the cable 136 is wound on the wheel 137 and elevates the front end of the platform 101 and the wagon thereon into the desired position, with the rear end of the wagon-box projecting over the door 108 toward the center of the hopper. The clutch 138 is released from the wheel 137 and said wheel is retained by the pawl 140 and ratchet 139 in engagement. The tail-gate of the wagon-box is opened. The grain runs from the wagon-box into the hopper and from the hopper into the conveyer-trough. The chain 120 rotates the sprocket-wheel 119, axle 118, hub 126, and wheel 125, and thereby operates the elevator-buckets to receive the grain from the conveyer-trough and elevate the same as desired. Simultaneously with the operation of the elevator the sprocket-wheel 130, chain 131, sprocket-wheel 132, shaft 133, bevel-gear 134, bevel-gear 135, and shaft 113 are operated to drive the conveyer 114 in such a direction that the flights 115 on the lower portion of said conveyer move and carry the grain along the trough and deliver the same through the aperture 116 into the interior of the wheel 125, and thence to the bottom of the elevator-leg to be received and elevated by the buckets 129. When the grain is all elevated, the horse-power is stopped, and the platform 101 is let down by releasing the pawl 140 from the ratchet 139 and controlling the reverse rotation of the wheel 137 by the friction-clutch 138. The trap-doors 108 110 are then closed upon the cleats 109, the wagon withdrawn over the horse-power to the ground, and the machine is in a position to receive and elevate another load of grain.

The machine may be mounted on trucks and transported as desired.

One of the advantages I claim for this form of machine is that the wagon rests entirely on the hinged platform 101, and in elevating said platform the distance required to locate the wagon-box at a proper angle relative to the horizontal to deliver the grain over the top of the door 108 I am enabled to lift the rear of the wagon several inches farther than if the wagon were tilted on the axis of the rear axle, resulting in a gain of several inches in the height of delivery, or a corresponding gain of several inches in a distance required to haul the wagon upon the platform 101 in the first instance.

By employing the ends 111 of the hopper, extended above the platform and forwardly and rearwardly from the portion of the hopper below the platform, and providing the cover of the hopper in two sections so arranged as to be positioned at right angles to form extensions to the front and rear sides of the hopper, I am enabled to provide a receptacle which will contain the amount of grain that may be hauled upon the platform in the wagon-box.

If desired, such connections may be made between the platform 101, the power-shaft 20, and the elevator as will lift and tilt the wagon gradually and operate the conveyer and elevator rapidly, so that when the wagon is tilted sufficiently to discharge the last portion of its load into the hopper nearly if not quite all the contents of the hopper will have been removed and elevated. If such connections are made, the hopper may be of less capacity, sufficient only to receive a portion of the load gradually until all of the load has passed through said hopper. With such an arrangement the platform 101 could be fulcrumed materially closer to the ground, and by so doing the hauling of the wagon several inches in elevation might be avoided.

I claim as my invention—

1. In a wagon-dump and elevator, a wagon-platform arranged for oscillation, an approach-platform, a well or hopper in said approach-platform, trap-doors arranged to close the top of said well or hopper at times and be elevated and form extensions of said hopper at times, side pieces 111 arranged above the platforms and forming extensions of the ends of the hopper and means for removing grain from said hopper.

2. In a wagon-dump and elevator, an elevator comprising a leg 117, a wheel 125 mounted for rotation therein and open at one end, an axial aperture in the elevator-leg in alinement with the axis of said wheel, chains mounted on said wheel, elevator-buckets connected with said chains and carried thereby and a conveyer for delivering grain to the interior of said leg, wheel and elevator-buckets through the said aperture in said leg.

JOHN S. KIDD.

Witnesses:
  S. C. SWEET,
  W. C. ELLIS.